United States Patent Office 2,761,212
Patented Sept. 4, 1956

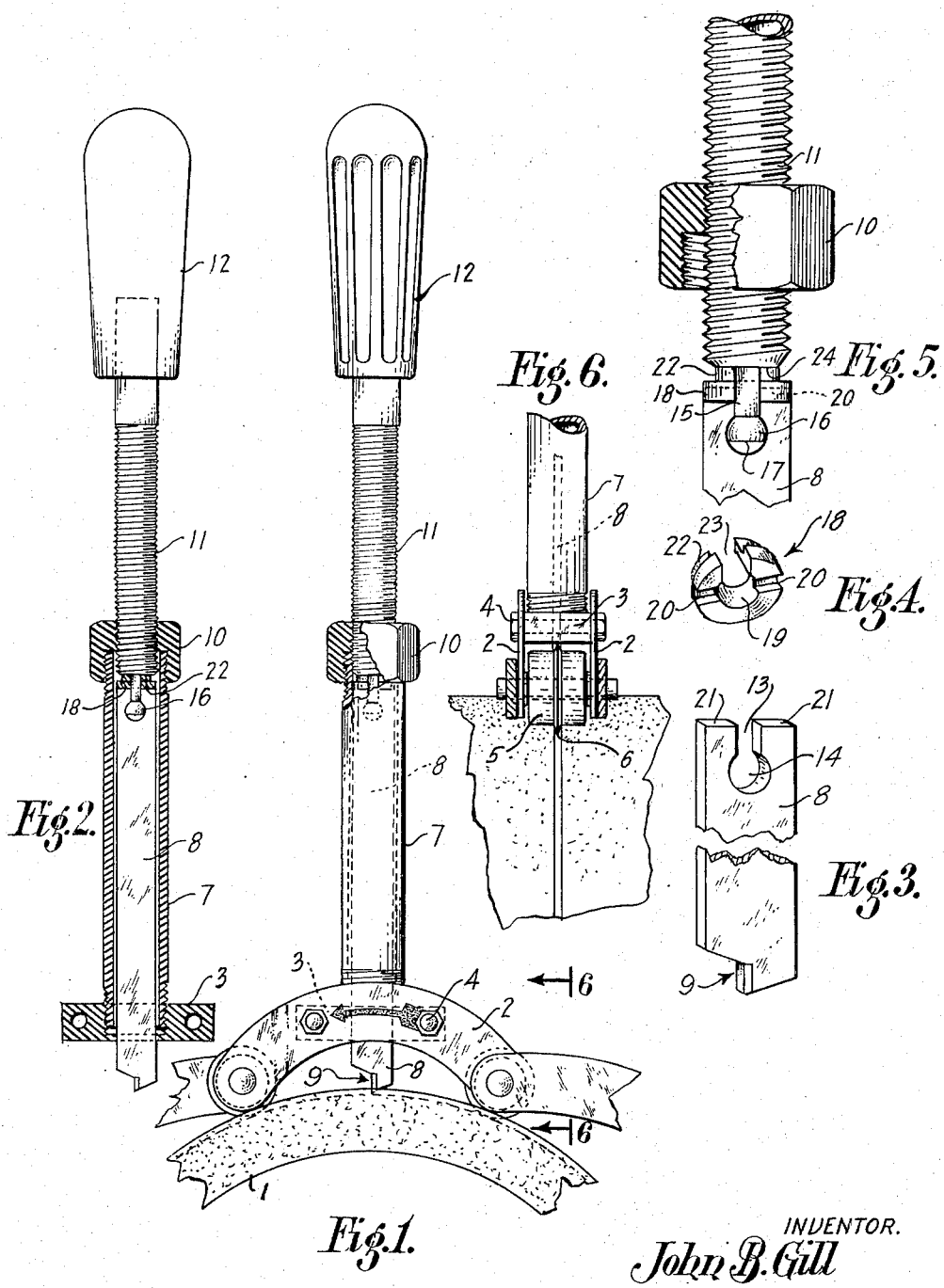

2,761,212

DRIVING CONNECTION FOR A CUTTER BLADE

John B. Gill, Torrance, Calif.

Application March 30, 1956, Serial No. 575,109

8 Claims. (Cl. 30—100)

The present invention relates to improvements in a driving connection for a cutter blade, and its principal object is to provide certain improvements in a blade drive used in connection with a pipe cutter such as is illustrated in my Patent No. 2,641,103, issued June 9, 1953.

In the patent the blade is shown as forming part of a chain of links wrapped about the pipe and as being carried by a tube extending radially from one of the links and operated by a feed screw threaded into a cap screwed on the tube.

The feed screw is connected to the rear end of the blade by means of a ball and slot joint, the ball being made to drive the blade in either direction upon a turning movement of the feed screw.

A certain disadvantage was inherent in this driving connection insofar as the ball, in the driving operation, would have a certain bending and twisting effect on the rear end of the blade resulting in uneven wear and deforming of the rear end of the blade.

In the present invention it is proposed to provide a remedy for this shortcoming, and to provide a drive between the feed screw and the blade in which the twisting and bending effect is avoided, and the rear end of the blade is maintained in perfect condition for an indeterminate period of time.

Further objects and advantages of my invention will appear as the specification proceeds, and the new and useful features of my driving connection for a cutter blade will be fully defined in the claims attached hereto.

The preferred form of my invention is illustrated in the accompanying drawing, forming part of this application, in which:

Figure 1 illustrates a side view of my improved cutter blade mounting as applied to a pipe to be cut;

Figure 2, a similar fragmentary view, with portions shown in section;

Figure 3, a perspective detail view of the cutter blade, with a portion broken away;

Figure 4, a perspective detail view of a thrust collar used in my invention;

Figure 5, an enlarged detail view of the driving connection between the feed screw and the blade; and Figure 6, a fragmentary rear view as seen from line 6—6 of Figure 1.

While I have shown only the preferred form of my invention, I wish to have it understood that various changes or modifications may be made within the scope of the claims attached hereto, without departing from the spirit of the invention.

Referring to the drawing in detail, Figure 1 shows the general arrangement of my cutter assembly, as applied to a pipe 1, the assembly being mounted on a pair of links 2 forming part of a chain wrapped around the pipe in accordance with the teachings of the patent hereinabove mentioned.

The two links are curved away from the pipe and are attached to one another by a central block 3, by means of bolts 4. The ends of the links carry rollers 5 formed with tracing ribs 6 intended to make the chain follow a true course as it is turned about the pipe.

A tube 7 has its lower end threaded into the block 3 to project radially with respect to the pipe and has the cutter blade 8 slidable therein. The blade is substantially co-extensive with the tube in length, is flat and rectangular in cross-section, as shown in Figure 3, and has a cutting edge 9 at the lower end thereof. Its lower end is guided in a slot in the block 3 so as to make the cutting edge follow the ribs 6 as the chain is revolved about the pipe. The width of the blade corresponds to the inner diameter of the tube for an easy sliding fit.

A cap 10 is threaded on the upper or outer end of the tube, and a feed screw 11 is threaded into the cap, the threads of the feed screw corresponding in numbers per inch to the threads on the tube. The feed screw has a handle 12 at the outer end thereof.

The present invention is directed to the driving connection between the feed screw and the outer end of the cutting blade.

The outer end of the blade is formed with a central lengthwise slot 13, terminating in a cylindrical hole 14 a short distance from the said end, the hole being larger than the width of the slot.

The inner end of the feed screw has a stem 15 projecting centrally therefrom, the stem being made to fit in the slot 13 and terminating, at its inner end, in a ball 16, which fits in the hole 14.

While, in the patented disclosure, this ball served as the driving member for the blade, this function has been taken away from it in the present invention, and the lower one-third of the ball may be cut away, as shown at 17, to avoid friction at this point. The main function of the ball, in the present invention, is to withdraw the blade, when the fed screw is turned in a reverse direction.

Driving connection between the feed screw and the blade is established by the brass thrust collar 18 illustrated in detail in Figure 4.

The thrust collar 18 has an opening 19 fitting on the stem 15, and is formed, in its bottom face, wtih a diametrical groove 20 fitting on the upper end of the blade, that is, on the two projections 21 left by the slot 13.

The outer diameter of the thrust collar is equal to the width of the blade, and to the inner diameter of the tube 7 so as to have a sliding fit therein. It is also equal to the outer diameter of the feed screw 11 which has a sliding fit in the tube.

The upper edge of the collar may be cut away, as at 22, to conform to the inner diameter of the thread of the feed screw, as shown in Figure 5.

The axial length of the collar is such that it fits on the stem 15 between the blade and the lower end of the feed screw and is in driving relation with the latter, as illustrated in Figure 5.

A side portion of the collar is cut away, as at 23, so as to allow the stem 15 and the ball 16 to be engaged in the slot 13 and the hole 14 from the side, after the collar has been positioned.

In assembling, the blade 8 is first introduced into the tube in approximately correct position for the cutting edge to aline with the slot in the block 3, with the outer end still projecting beyond the outer end of the tube.

Next, the thrust collar 18 is applied to the outer end of the blade, the slots 20 engaging over the projecting ends 21 of the blade. In this position the cut-away 23 of the thrust collar registers with the slot 13 in the blade.

Next the stem 15 and ball 16 of the feed screw are introduced from the side through the cut-away 23, and into the slot 13 and the hole 14, whereupon the feed screw is pushed toward and inside the tube, making certain that the cutting end of the blade passes through the slot in block 3, and the assembly is completed by screwing the cap 10 on the tube.

In operation:

After the chain has been placed about the pipe and has been revolved about the same sufficiently for the rollers 5 to trace an annular path, the feed screw is turned to bring the cutting end of the blade into cutting contact with the pipe, as shown in Figure 1, and the revolving movement is continued, while the operator gradually deepens the engagement by successive turns of the feed screw.

During this operation the entire driving force is transmitted from the feed screw to the blade at the contacting faces of the feed screw and thrust washer, as at 24, and the thrust collar keeps the upper end of the blade perfectly centered with respect to the tube, avoiding wear and twisting at the end of the blade, and eliminating any wear at the bottom of the hole 14 in the blade, since the ball does not perform any driving function.

After the cut has been completed, the blade may be readily withdrawn by reversing the rotation of the feed screw, in which operation the ball 16 transmits movement to the blade.

I claim:

1. In a cutter blade mounting, a tube having means at one end for anchoring the same with respect to the work, an elongated flat cutter blade slidable in the tube, a block in the said end of the tube having a slot for guiding the lower end of the blade, the upper end of the blade having a lengthwise slot therein and a circular hole at the bottom of the slot, a cap for the upper end of the tube having a threaded opening therein, a feed screw threaded into the cap and having a projecting stem and ball fitting in the slot and the hole, respectively, and a thrust collar having a diametrical groove fitting over the upper edge of the blade and having a sliding fit in the tube, the lower end of the feed screw being made to bear on the upper edge of the thrust collar for advancing the blade when the feed screw is turned in one direction, and the ball retracting the blade when the feed screw is turned in the opposite direction.

2. In a cutter blade mounting, a tube having means at one end for anchoring the same with respect to the work, an enlongated flat cutter blade slidable in the tube, a block in the said end of the tube having a slot for guiding the lower end of the blade, the upper end of the blade having a lengthwise slot therein and a circular hole at the bottom of the slot, a cap for the upper end of the tube having a threaded opening therein, a feed screw threaded into the cap and having a projecting stem and ball fitting in the slot and the hole, respectively, and a thrust collar having a diametrical groove fitting over the upper edge of the blade and having a sliding fit in the tube, the lower end of the feed screw being made to bear on the upper edge of the thrust collar for advancing the blade when the feed screw is turned in one direction, and the ball retracting the blade when the feed is turned in the opposite direction, the thrust collar having a sidewise opening allowing the stem to slide through the same for engagement in the slot.

3. In a driving connection of the character described, an elongated flat cutter blade having a lengthwise slot in the rear end thereof and having a circular hole communicating with the slot, a feed screw alined with the blade and having a projecting stem and ball fitting in the slot and hole, respectively, and a thrust collar having a diametrical groove fitting over the rear end of the blade, the collar having an outer diameter commensurate with the width of the blade, and the end of the feed screw being made to bear on the thrust collar.

4. In a driving connection of the character described, an elongated flat cutter blade having a lengthwise slot in the rear end thereof and having a circular hole communicating with the slot, a feed screw alined with the blade and having a projecting stem and ball fitting in the slot and hole, respectively, and a thrust collar having a diametrical groove fitting over the rear end of the blade, the collar having an outer diameter commensurate with the width of the blade, and the end of the feed screw being made to bear on the thrust collar, and the thrust collar having a sidewise opening allowing the stem to pass through the same for engagement in the slot.

5. In a driving connection of the character described, an elongated flat cutter blade having a lengthwise slot in the rear end thereof and having a circular hole communicating with the slot, a feed screw alined with the blade and having a projecting stem and ball fitting in the slot and hole, respectively, and a thrust collar having a diametrical groove fitting over the rear end of the blade, the collar having an outer diameter commensurate with the width of the blade, and the end of the feed screw being made to bear on the thrust collar, a tube surrounding the blade and having means for guiding the front end thereof, and a cap threaded on the rear end of the tube, the cap having the feed screw threaded thereinto.

6. In a driving connection of the character described, an elongated flat cutter blade having a lengthwise slot in the rear end thereof and having a circular hole communicating with the slot, a feed screw alined with the blade and having a projecting stem and ball fitting in the slot and hole, respectively, and a thrust collar having a diametrical groove fitting over the rear end of the blade, the collar having an outer diameter commensurate with the width of the blade, and the end of the feed screw being made to bear on the thrust collar, and the thrust collar having a sidewise opening allowing the stem to pass through the same for engagement in the slot, a tube surrounding the blade and having means for guiding the front end thereof, and a cap threaded on the rear end of the tube, the cap having the feed screw threaded thereinto.

7. In a driving connection of the character described, an elongated flat cutter blade having a lengthwise slot in the rear end thereof and having an enlarged hole communicating with the slot, a feed screw alined with the blade and having a projecting stem and enlargement fitting in the slot and hole, respectively, and a thrust collar having a diametrical groove fitting over the rear end of the blade and contacting the feed screw.

8. In a driving connection of the character described, an elongated flat cutter blade having a lengthwise slot in the rear end thereof and having an enlarged hole communicating with the slot, a feed screw alined with the blade and having a projecting stem and enlargement fitting in the slot and hole, respectively, and a thrust collar having a diametrical groove fitting over the rear end of the blade and contacting the feed screw, the thrust collar having a sidewise opening registering with the slot when the collar is fitted over the blade.

No references cited.